United States Patent
Le-Cam et al.

(10) Patent No.: US 10,315,646 B2
(45) Date of Patent: Jun. 11, 2019

(54) METHOD FOR CONTROLLING STATE CHANGES OF A DRIVETRAIN

(71) Applicant: RENAULT s.a.s., Boulogne-Billancourt (FR)

(72) Inventors: Florent Le-Cam, Lardy (FR); Frederic Roudeau, Vitry sur Seine (FR); Aurelien Lefevre, Meudon (FR)

(73) Assignee: Renault s.a.s., Boulogne-Billancourt (FR)

( * ) Notice: Subject to any disclaimer, the term of this patent is extended or adjusted under 35 U.S.C. 154(b) by 20 days.

(21) Appl. No.: 15/526,887

(22) PCT Filed: Nov. 20, 2015

(86) PCT No.: PCT/FR2015/053162
§ 371 (c)(1),
(2) Date: May 15, 2017

(87) PCT Pub. No.: WO2016/087741
PCT Pub. Date: Jun. 9, 2016

(65) Prior Publication Data
US 2017/0355365 A1 Dec. 14, 2017

(30) Foreign Application Priority Data

Dec. 2, 2014 (FR) .................................. 14 61765

(51) Int. Cl.
*B60W 20/19* (2016.01)
*B60W 30/182* (2012.01)
(Continued)

(52) U.S. Cl.
CPC ............ *B60W 20/19* (2016.01); *B60W 20/10* (2013.01); *B60W 30/182* (2013.01);
(Continued)

(58) Field of Classification Search
CPC .. B60W 20/10; B60W 20/19; B60W 2520/10; B60W 2530/16; B60W 2540/10;
(Continued)

(56) References Cited

U.S. PATENT DOCUMENTS 9,315,189 B2 * 4/2016 Mould .................. B60W 10/08
2002/0107106 A1 * 8/2002 Kato .................. B60K 31/0008
477/110
(Continued)

FOREIGN PATENT DOCUMENTS

FR 2 911 567 A1 7/2008
FR 2 928 122 A1 9/2009
(Continued)

OTHER PUBLICATIONS

International Search Report dated Jan. 27, 2016 in PCT/FR2015/053162 filed Nov. 20, 2015.
(Continued)

*Primary Examiner* — Tyler J Lee
(74) *Attorney, Agent, or Firm* — Oblon, McClelland, Maier & Neustadt, L.L.P.

(57) ABSTRACT

A method controls state changes of a drivetrain of a vehicle connecting at least one heat engine and/or one electric motor to the wheels of the vehicle via a transmission, providing the transfer of torque from the heat engine and/or from the electric motor to the wheels in one or more gear ratios. The authorization to switch from a current state to a target state depends on reducing an acceleration of the vehicle in an intermediate state causing a lower acceleration of the vehicle during the transition between the current state and the target state.

7 Claims, 3 Drawing Sheets

(51) Int. Cl.
　　　*B60W 50/06*　　(2006.01)
　　　*B60W 20/10*　　(2016.01)
(52) U.S. Cl.
　　　CPC ......... *B60W 50/06* (2013.01); *B60W 2520/10* (2013.01); *B60W 2530/16* (2013.01); *B60W 2540/10* (2013.01); *B60W 2720/106* (2013.01); *Y02T 10/7258* (2013.01)
(58) Field of Classification Search
　　　CPC ......... B60W 2720/106; B60W 30/182; B60W 50/06
　　　See application file for complete search history.

(56) References Cited

U.S. PATENT DOCUMENTS

| | | | |
|---|---|---|---|
| 2005/0209046 A1* | 9/2005 | Potter | F16H 61/0213 477/115 |
| 2006/0048988 A1* | 3/2006 | Dreibholz | B60K 6/442 180/213 |
| 2009/0093330 A1* | 4/2009 | Kumazaki | B60K 6/365 475/5 |
| 2011/0035127 A1* | 2/2011 | Ishikawa | F16H 59/66 701/65 |
| 2012/0072064 A1* | 3/2012 | Kumazaki | F16H 61/0213 701/22 |
| 2012/0179342 A1* | 7/2012 | Noumura | B60W 10/06 701/54 |
| 2012/0265387 A1* | 10/2012 | Hisada | B60K 6/383 701/22 |
| 2015/0291152 A1 | 10/2015 | Mould et al. | |

FOREIGN PATENT DOCUMENTS

| | | |
|---|---|---|
| FR | 3 001 188 A1 | 7/2014 |
| WO | WO 2013/110706 A1 | 8/2013 |

OTHER PUBLICATIONS

French Preliminary Search Report dated Aug. 11, 2015 in Patent Application No. 1461765 filed Dec. 2, 2014.

* cited by examiner

METHOD FOR CONTROLLING STATE CHANGES OF A DRIVETRAIN

BACKGROUND

The present invention concerns the control strategies implemented in powertrain computation units.

It finds a preferred but non-limiting application to powertrains comprising at least one internal combustion engine and one electrical traction machine.

To be more precise, an object of this invention is a method for controlling state changes of a vehicle drivetrain connecting at least one internal combustion engine and/or one electrical machine to the wheels of the vehicle via a transmission that transfers torque from the internal combustion engine and/or the electrical machine to the wheels in accordance with one or more gear ratios.

These states are defined by various combinations of couplers and reducers to transfer torque from the internal combustion engine and/or the electrical machine to the wheels in accordance with one or more gear ratios. The state of a drivetrain can therefore be defined by a combination of solicited couplers and reducers. The state target of the drivetrain aims to optimize the operating point of the powertrain. In an internal combustion powertrain, a drivetrain state can simply be defined by the engagement of a ratio and the position (open or closed) of an input clutch between the engine and the gearbox. On a hybrid powertrain, its definition is necessarily more complex because it has to integrate the state of one or more electrical machines that are able to propel the vehicle via the same axle as the internal combustion engine or via another axle.

On a hybrid vehicle, the acoustic behavior of the vehicle depends, inter alia, on the distribution between electrical power and internal combustion power. Harshness, linked to the performance of the powertrain, also depends on the state of charge of the traction battery, as only the internal combustion engine is usable when it is discharged. Finally, energy management laws that determine the distribution of power in compliance with consumption and pollution reduction constraints at each operating point. Similarly, a classification of the optimum states of the drivetrain must also take account of the state of charge of the battery.

The drivetrains of a internal combustion vehicle and a hybrid vehicle also differ considerably:
- on a hybrid vehicle, the internal combustion engine is not the only source of motor power;
- for the same power demand, there is a plurality of possible combinations of the power delivered by the internal combustion engine and that delivered by the electric motor(s);
- depending on the technical definition envisaged, power from the electrical machine either passes through the transmission or does not;
- the static and dynamic max/min limitations of the hybrid powertrain depend on the state of charge of the battery and so vary over time;
- the electric or ZEV (zero emission vehicle) traction mode combines one or more specific states of the drivetrain by the same token as the discrete ratios of the internal combustion engine.

Generally speaking, acoustic phenomena, harshness and likewise the consumption and pollution reduction level address particular constraints on a hybrid vehicle. For the same operating point (speed, motor power), the acoustic level of the powertrain depends on the distribution between electric power and internal combustion power, the electric motor being quieter.

Harshness, which is linked to the performance of the powertrain, depends on the state of charge of the battery. If it is charged, it is possible to use simultaneously the power delivered by the electric motor and by the internal combustion engine. If it is discharged, the overall power available is reduced as the only source of energy available is the internal combustion engine, with a possible reduction of performance. Finally, the consumption and pollution reduction requirements are taken into account in energy management laws that in each hybrid state establish the distribution between the power delivered by the internal combustion engine and that delivered by the electrical machines as a function of the state of charge of the battery.

Moreover, depending on the type of hybrid architecture, the sources of motor power can be installed in the vehicle in various configurations. For example, the electrical machine(s) are associated with the rear wheels, the crankshaft, the secondary shaft of the gearbox, etc. However, the states of the drivetrain of any hybrid vehicle are defined as combinations of the traction units via or not via a transmission with a plurality of ratios. Two target states X and Y can therefore be arrived at in different ways from a current drivetrain state Z. The state changes result from different mechanical changes in the transmission, for example:
- coupling the electrical machine without changing ratio for the internal combustion engine,
- changing the ratio of the internal combustion engine with the ratio of the electrical machine being maintained,
- changing the ratio of the electrical machine without internal combustion engine, etc.

Accordingly, a change from a current state Z can proceed with total interruption of the torque at the wheel, a reduction of the level of torque at the wheel or else with no reduction of the level of torque, depending on the target states X or Y, or in accordance with mechanical changes effected by the transmission. Through significant unanticipated reductions of acceleration, reductions or interruptions of torque at the wheel during changes of state are negatively perceived in terms of harshness by the driver and his passengers and degrade performance, such as the "brio" of the vehicle.

The problem is encountered on a hybrid transmission as described in the publication WO2012131259, for example.

This problem is illustrated in the following way in FIG. 1, in which are shown maximum acceleration curves for different kinematic modes of the transmission. If it is considered that at the operating point 1 in the diagram the current state of the drivetrain is an electric ratio termed ZEV1 and that the vehicle has reached its maximum speed in that state, the transmission must switch to another drivetrain state addressing the harshness constraints associated with the point 1 but also the energy optimization of the vehicle. From the point 1, the states termed HYB23, TH2, HYB33 and ZEV3 respectively corresponding to a first hybrid ratio, an internal combustion ratio, a second hybrid ratio and another electric ratio are permissible from the harshness point of view. However, once established they offer different services. Moreover, the changes to HYB23 and TH2 can be achieved without interruption or reduction of the acceleration of the vehicle, whereas the changes to ZEV3 and HYB33 result in a significant reduction in the acceleration of the vehicle because producing those states involves a passage through the neutral state of the transmission involving total interruption of the torque at the wheels. If an energy optimization criterion calls for the ZEV3 or HYB33 state, the service of changing to one of those states will be degraded by the interruption in torque whereas a change to the other two drivetrain states would offer a better client service and better performance of the vehicle.

BRIEF SUMMARY

In a context of this kind, the aim is to prevent a drivetrain state that is eligible to be established according to a criterion linked to its services but involving a reduction of the acceleration of the vehicle that is not tolerable or total interruption of the acceleration of the vehicle from being selected as target.

The present invention aims to prevent access to drivetrain states causing too great a reduction of the acceleration of the vehicle. It achieves this by prohibiting any change of state causing reduction or interruption of the acceleration of the vehicle beyond a determined threshold.

To this end, the invention proposes that the authorization of the change from the current state to a target state depend on the reduction of the acceleration of the vehicle in the intermediate state causing the lowest acceleration of the vehicle during the transition between the current state and the target state.

The difference in acceleration of the vehicle between the effective operating point at the current ratio before the transition and an effective operating point in the intermediate state is preferably calculated.

According to one preferred embodiment of the invention the calculation of the reduction of acceleration in the intermediate state depends on the current state of the drivetrain, an estimate of the resisting forces, the target force or torque at the driver's wheels and the maximum forces that can be achieved in the current state and in the intermediate state.

This method is applicable to all internal combustion, hybrid and electric vehicles equipped with an automatic transmission whether or not featuring partial or total interruption of the traction torque and having at least two distinct states of the drivetrain.

BRIEF DESCRIPTION OF THE DRAWINGS

The invention will be better understood on reading the following description of one non-limiting embodiment thereof with reference to the appended drawings, in which.

DETAILED DESCRIPTION

Figure 1:
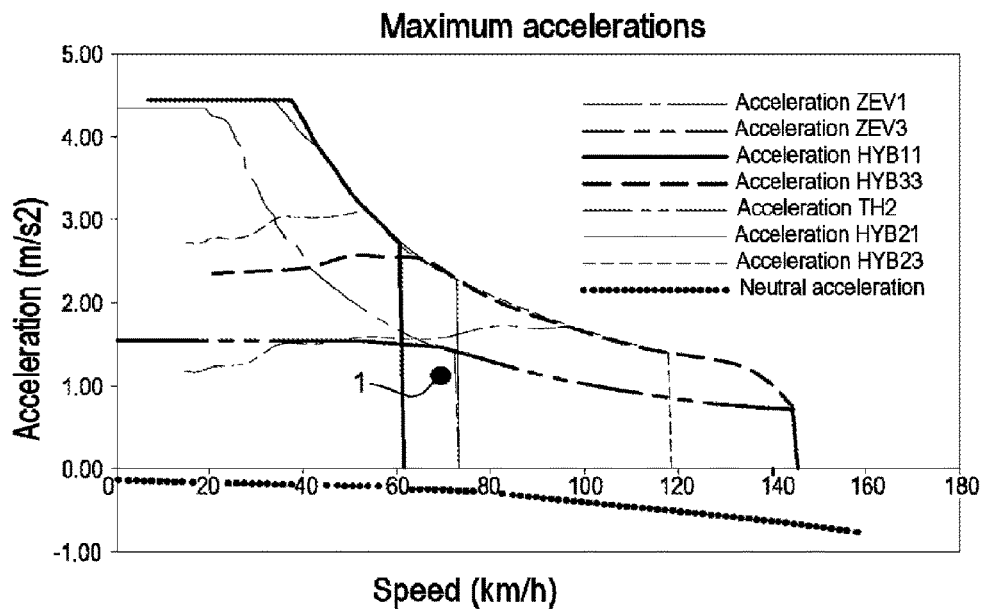
FIG. 1 illustrates the problem encountered by means of an example.
Figure 2:
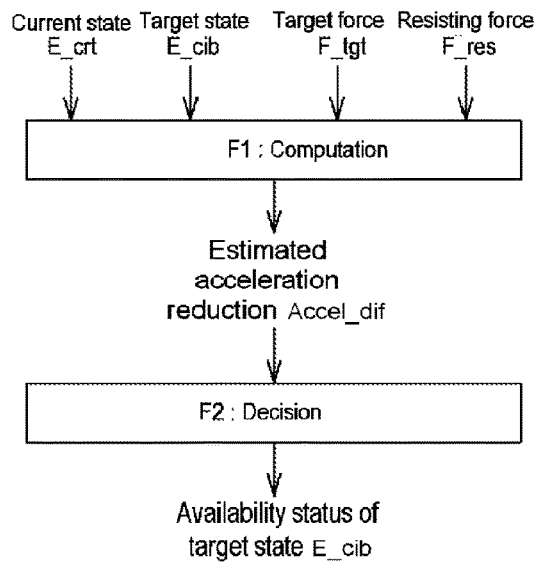
FIG. 2 is a flowchart of the method of the invention.
Figure 3:
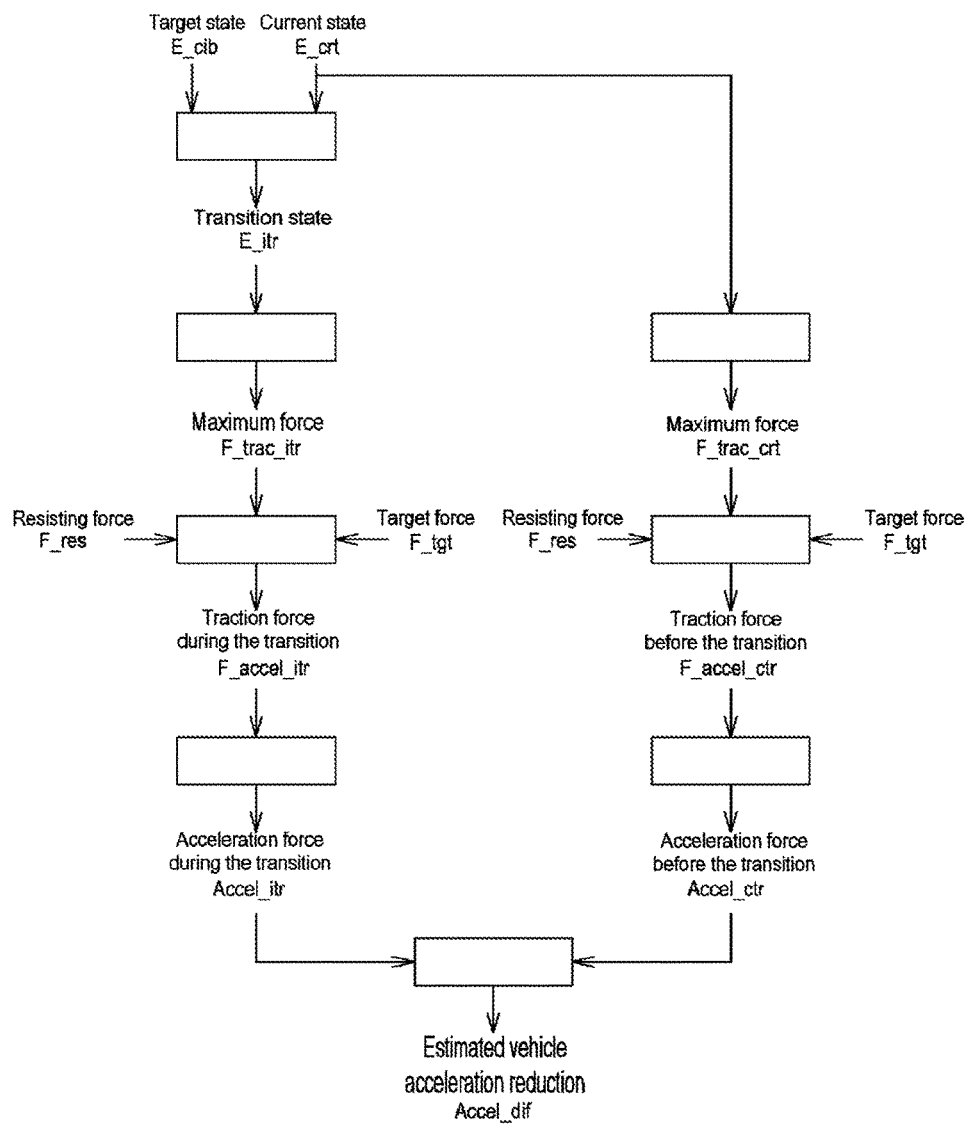
FIGS. 3 and 4 expand on two subsections of that flowchart.
Figure 4:
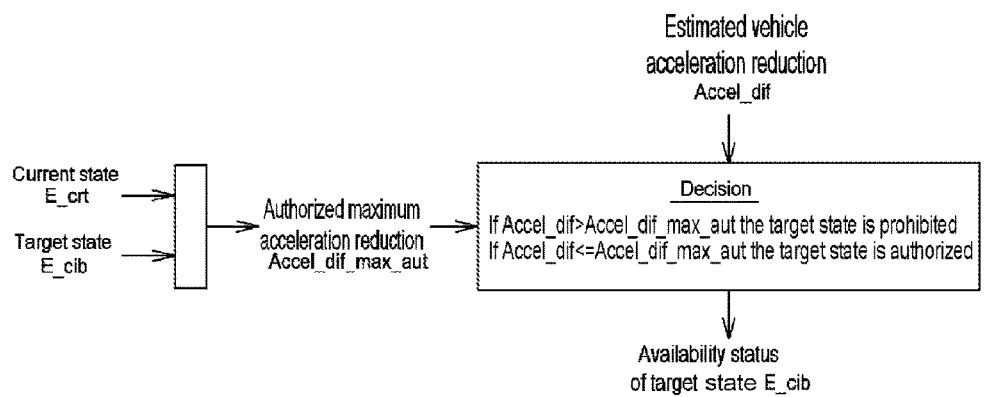

The method of the invention controls the state changes of a vehicle drivetrain connecting at least one internal combustion engine and/or one electrical machine to the wheels of the vehicle via a transmission transferring torque from the internal combustion engine and/or the electrical machine to the wheels in accordance with one or more gear ratios. It is broken down into a plurality of steps leading to prohibiting or authorizing the drivetrain to switch from the current state E_crt to a target state E_cib as a function of the reduction of the acceleration of the vehicle that is caused by the transition. This strategy is applied in an identical manner for all potential target states of the drivetrain. However, if the target state considered corresponds to the current state, maintaining that state is not subject to this strategy.

The first step consists in defining an essential datum of the switch from the current state E_crt to a target state E_cib. This is the intermediate state E_itr causing the lowest vehicle acceleration between those two states. In most cases (but not always), this is the neutral position of the transmission, notably if the latter leads to a total interruption of the torque; in other cases, it is the state supplying the minimum torque during the transition if there is only partial or no interruption of the torque during the latter. According to the invention, the authorization to switch from the current state to a target state depends on the reduction of the acceleration of the vehicle in the intermediate state E_itr causing the lowest acceleration of the vehicle during the transition between the current state E_crt and the available target state E_cib.

The object of the second step is to compute the reduction of the acceleration of the vehicle that is caused by the switch from the state E_crt to the state E_cib. This reduction depends above all on the acceleration before and during the switch and therefore on the forces applied to the vehicle. Those forces are the total resisting forces applied to the vehicle F_res, the traction force at the wheels before the switch, termed F_trac_crt, and the traction force at the wheels during the change, termed F_trac_itr. The traction force F_trac_itr is the minimum force between the traction force target F_tgt and the maximum possible force in the intermediate state E_itr. In an analogous manner, the force F_trac_crt is the minimum force between the traction force target F_tgt and the maximum possible force of the current state E_crt.

During a second step, the difference in the acceleration of the vehicle between the effective operating point at the current ratio E_crt before the transition and an effective operating point in the intermediate state E_itr is computed. The reduction of acceleration in the intermediate state depends on the current state E_crt of the drivetrain, an estimate of the resisting forces F_res, the target force or torque at the driver's wheels F_tgt and the maximum forces F_trac_crt and F_trac_itr in the current state and the intermediate state.

The sequencing of the second step is as follows:

a) computation of the force that accelerates the vehicle before the transition (F_accel_crt), equal to the traction force (F_trac_crt) less all the resisting forces (F_res), b) computation of the effective acceleration before the change Accel_crt as a function of the inertia of the vehicle and the force Faccelcrt (Accel_crt=F_accel_crt/vehicle_inertia), c) computation of the force accelerating the vehicle during the transition (F_accel_itr): this is the traction force F_trac_itr subtracted from all the resisting forces F_res, d) computation of the effective acceleration during the switch Accel_itr as a function of the inertia of the vehicle and the force F_accel_itr (Accel_itr=F_accel_itr/vehicle_inertia), e) computation of the reduction of the acceleration of the vehicle caused by the transition from E_crt to E_cib: Accel_dif=Accel_crt-Accel_itr.

The difference in acceleration between the current state and the intermediate state is compared to a maximum authorized acceleration reduction threshold (Accel_dif_max_aut) depending on the current state (E_crt) and the target state (E_cib). A third step consists in defining the maximum authorized vehicle acceleration reduction threshold Accel_dif_max_aut. This threshold depends on the states E_cib and E_crt and represents the maximum acceleration reduction tolerated in the target state.

The fourth and final step in this sequence consists in deciding whether to authorize or prohibit the target states of the drivetrain. The transition to the target state E_cib is prohibited from the current state E_crt if the acceleration difference Accel_dif is greater than the threshold Accel_dif_max_aut. It is authorized if that difference is less than or equal to that same threshold.

Finally, time-delays are employed to prevent successions of state changes which can be caused by the application of this strategy. In particular, when a change to a target state A other than the state B that would have been chosen without application of the method has just been effected, the transition to that state B is prohibited momentarily, even if it is thereafter authorized from the state A. This prohibition is maintained for a time-delay the duration of which is parameterizable. In other words, a transition from a current state A to a target state B that has been set aside when the preceding transition to the state A has been effected but that would be authorized from the state A is suspended during a time-delay period.

Figure 5:
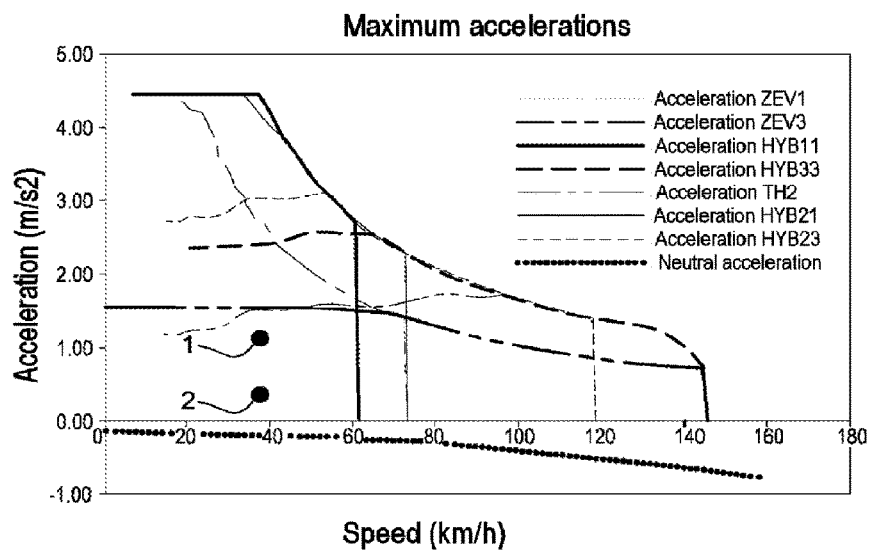
FIG. 5 illustrates the application of the method to the cited example.

FIG. 5 repeats the acceleration curves from FIG. 1. Considering that the two current operating points 1 and 2 are in the current state HYB11, the following tables illustrate the application of the method for a switch to the target state ZEV3 and HYB21 at the point 1 (table 1) and at the point 2 (table 2).

TABLE 1

|  | Case | |
| --- | --- | --- |
|  | 1 | 2 |
| E_crt | HYB11 | HYB11 |
| E_cib | ZEV3 | HYB21 |
| E_itr | Neutral | ZEV1 |
| F_res (N) | 140 | 140 |
| F_tgt (N) | 1400 | 1400 |
| Accel_crt (m/s$^2$) | 0.9 | 0.9 |
| Accel_itr (m/s$^2$) | −0.1 | 0.9 |
| Accel_dif (m/s$^2$) | 1 | 0 |
| Accel_dif_max_aut (m/s$^2$) | 0.75 | 1 |
| E_cib | Prohibited | Authorized |

TABLE 2

|  | Case | |
| --- | --- | --- |
|  | 1 | 2 |
| E_crt | HYB11 | HYB11 |
| E_cib | ZEV3 | HYB21 |
| E_itr | Neutral | ZEV1 |
| F_res (N) | 140 | 140 |
| F_tgt (N) | 280 | 280 |
| Accel_crt (m/s$^2$) | 0.1 | 0.1 |
| Accel_itr (m/s$^2$) | −0.1 | 0.1 |
| Accel_dif (m/s$^2$) | 0.2 | 0 |
| Accel_dif_max_aut (m/s$^2$) | 0.75 | 1 |
| E_cib | Prohibited | Authorized |

From the operating point 1 in FIG. 5:

a) in case 1 where the target is ZEV3, access to the ZEV3 state is prohibited because it would cause a reduction of the acceleration above the maximum threshold Accel_dif_max_aut; in fact:

the intermediate state E_itr for switching to the target state E_cib ZEV3 is the neutral state, the estimated acceleration in the current state is Accel_crt=0.9 m/s$^2$, the estimated acceleration in the transient neutral state is Accel_itr=−0.1 m/s$^2$, the reduction of the vehicle acceleration is Accel_dif=1 m/s$^2$, the authorized maximum vehicle acceleration reduction Accel_dif_max_aut is 0.75 m/s$^2$ for switching from HYB11 to ZEV3, b) in case 2 where the target is HYB21, that state is authorized because the reduction of the vehicle acceleration is below the maximum threshold; in fact:

the intermediate state E_itr for switching to the target state E_cib HYB21 is the state ZEV1, the estimated acceleration in the current state is Accel_crt=0.9 m/s$^2$, the estimated acceleration in the transient state ZEV1 is Accel_itr=0.9 m/s$^2$, the reduction of the vehicle acceleration is Accel_dif=0 m/s$^2$, the authorized maximum vehicle acceleration reduction Accel_dif_max_aut to switch from HYB11 to HYB21 is 1 m/s$^2$.

From the operating point 2 in FIG. 5:

a) in case 1 where the target is ZEV3, that state is authorized because the reduction of the vehicle acceleration is below the maximum threshold; in fact:

the intermediate state E_itr for switching to the target state E_cib ZEV3 is the neutral state, the estimated acceleration in the current state is Accel_crt=0.1 m/s$^2$, the estimated acceleration in the transient neutral state is Accel_itr=−0.1 m/s$^2$, the reduction of the acceleration Accel_dif=0.2 m/s$^2$, the authorized maximum vehicle acceleration reduction Accel_dif_max_aut for the switch from HYB11 to ZEV3 is 0.75 m/s$^2$, b) in case 2 where the target is HYB21, therefore, the state is authorized because the reduction of the vehicle acceleration is below the maximum threshold Accel_dif_max_aut; in fact:

the intermediate state E_itr for switching to the target state E_cib HYB21 is the state ZEV1, the estimated acceleration in the current state is Accel_crt=0.1 m/s$^2$, the estimated acceleration in the transient state ZEV1 is Accel_crt=0.1 m/s$^2$, the reduction of the acceleration Accel_dif=0 m/s$^2$, the authorized maximum vehicle acceleration reduction Accel_dif_max_aut for switching from HYB11 to HYB21 is 1 m/s$^2$.

In conclusion, the proposed method has numerous advantages, of which must be cited:

its ease of implementation, its operation in real time enabling account to be taken of changing vehicle parameters, like the maximum forces in the transition states, external forces, etc., its application to all hybrid architectures having a transmission with at least two distinct drivetrain states.

The invention claimed is:

1. A method for controlling state changes of a drivetrain of a vehicle connecting at least one internal combustion engine and/or one electrical machine to wheels of the vehicle via a transmission, providing a transfer of torque from the internal combustion engine and/or from the electrical machine to the wheels in accordance with one or more gear ratios, the method comprising:
- determining an acceleration of the vehicle in a current state;
- determining a lowest acceleration of the vehicle in an intermediate state during a switch from the current state to a target state;
- computing an acceleration difference of the vehicle between the acceleration of the vehicle in the current state and the lowest acceleration of the vehicle in the intermediate state; and
- authorizing a switch from the current state to the target state when the difference is below an authorized maximum vehicle acceleration reduction.

2. The control method as claimed in claim 1, further comprising computing an acceleration difference of the vehicle between an effective operating point in the current state before a transition and an effective operating point in the intermediate state.

3. The control method as claimed in claim 2, wherein the computing the acceleration difference depends on the current state of the drivetrain, an estimate of resisting forces, a target force or torque at the wheels, and maximum forces and in the current state and in the intermediate state.

4. The control method as claimed in claim 2, wherein the computing the acceleration difference includes the following steps:
- computing a force accelerating the vehicle before the transition (F_accel_crt), equal to a traction force (F_trac_crt) minus all resisting forces (F_res),
- computing an effective acceleration before the switch (Accel_crt), before the transition, as a function of the force F_accel_crt and an inertia of the vehicle: Accel_crt=F_accel_crt/vehicle_inertia,
- computing a force accelerating the vehicle during the transition (F_accel_itr), equal to a traction force (F_trac_itr) minus all the resisting forces (F_res),
- computing the effective acceleration during the switch Accel_itr as a function of the inertia of the vehicle and the force F_accel_itr: Accel_itr=F_accel_itr/vehicle_inertia, and
- computing a reduction of the acceleration of the vehicle: Accel_dif=Accel_crt−Accel_itr.

5. The control method as claimed in claim 2, wherein the acceleration difference between the current state and the intermediate state is compared to an authorized maximum acceleration reduction threshold depending on the current state and the target state.

6. The control method as claimed in claim 5, wherein the transition to the target state is prohibited from the current state when the acceleration difference is above the threshold and the transition is authorized when the acceleration difference is below or equal to the threshold.

7. The control method as claimed in claim 1, wherein a transition from a current state A to a target state B that was set aside when a preceding transition to a ratio A had been effected but that would be authorized from the latter is suspended during a time-delay period.

* * * * *